United States Patent [19]
Kanno et al.

[11] Patent Number: 5,844,883
[45] Date of Patent: Dec. 1, 1998

[54] RECORDING MEDIUM, OPTICAL DISK APPARATUS AND METHOD OF INFORMATION RECORDING

[75] Inventors: Masayoshi Kanno, Tokyo; Masato Hattori, Chiba, both of Japan

[73] Assignee: Sony Corporation, Tokyo, Japan

[21] Appl. No.: 823,879

[22] Filed: Mar. 17, 1997

[30] Foreign Application Priority Data

Mar. 25, 1996 [JP] Japan .................................... 8-067880

[51] Int. Cl.$^6$ ....................................................... G11B 7/24
[52] U.S. Cl. ......................... 369/275.4; 369/277; 369/58
[58] Field of Search ................................. 369/275.4, 277, 369/275.3, 58, 278, 279, 44.26, 275.1

[56] References Cited

U.S. PATENT DOCUMENTS

| | | | |
|---|---|---|---|
| 4,363,116 | 12/1982 | Kleuters et al. | 369/30 |
| 5,185,730 | 2/1993 | Komaki et al. | 369/44.26 |
| 5,210,738 | 5/1993 | Iwata et al. | 369/275.1 |
| 5,212,682 | 5/1993 | Sakurai | 369/275.3 |
| 5,418,768 | 5/1995 | Senshu | 369/59 |
| 5,444,682 | 8/1995 | Yamada et al. | 369/32 |
| 5,508,995 | 4/1996 | Moriya et al. | 369/275.4 |
| 5,566,141 | 10/1996 | Yamaguchi et al. | 369/32 |
| 5,671,164 | 9/1997 | Kanno et al. | 364/569 |

FOREIGN PATENT DOCUMENTS

0371880 A2  6/1990  European Pat. Off. .
WO 91/08568  6/1991  WIPO .

OTHER PUBLICATIONS

Patent Abstracts of Japan, JP 5-314538, Published Nov. 26, 1993, Sharp Corporation.
Patent Abstracts of Japan, JP 7-161045, Published Jun. 23, 1995, Sharp Corporation.
Patent Abstracts of Japan, JP 2-087344, Published Mar. 28, 1990, Sony Corporation.
Patent Abstracts of Japan, JP 2-232833, Published Sep. 14, 1990, Hitachi Ltd.

*Primary Examiner*—Tan Dinh
*Attorney, Agent, or Firm*—Limbach & Limbach, LLP

[57] ABSTRACT

A recording medium such as an optical disk with address information retained relative to tracks where data are recorded and/or reproduced. In this disk, lands and grooves are arranged alternately, and either the lands or the grooves constitute tracks. The grooves wobbled on the basis of address information and the non-wobbled DC grooves are arranged alternately while the lands are interposed therebetween. There is also provided an optical disk apparatus which comprises an irradiator for irradiating a first light beam spot to a target track on the optical disk, and further irradiating second and third light beam spots to the diametrical two sides of the center light beam spot; a light beam receiver for receiving the reflections of the first, second and third light beam spots from the optical disk, to thereby obtain first, second and third signals; and a calculator for calculating an address signal on the basis of the second and third signals.

27 Claims, 16 Drawing Sheets

ADIP (ADDRESS IN PREGROOVE) ENCODER

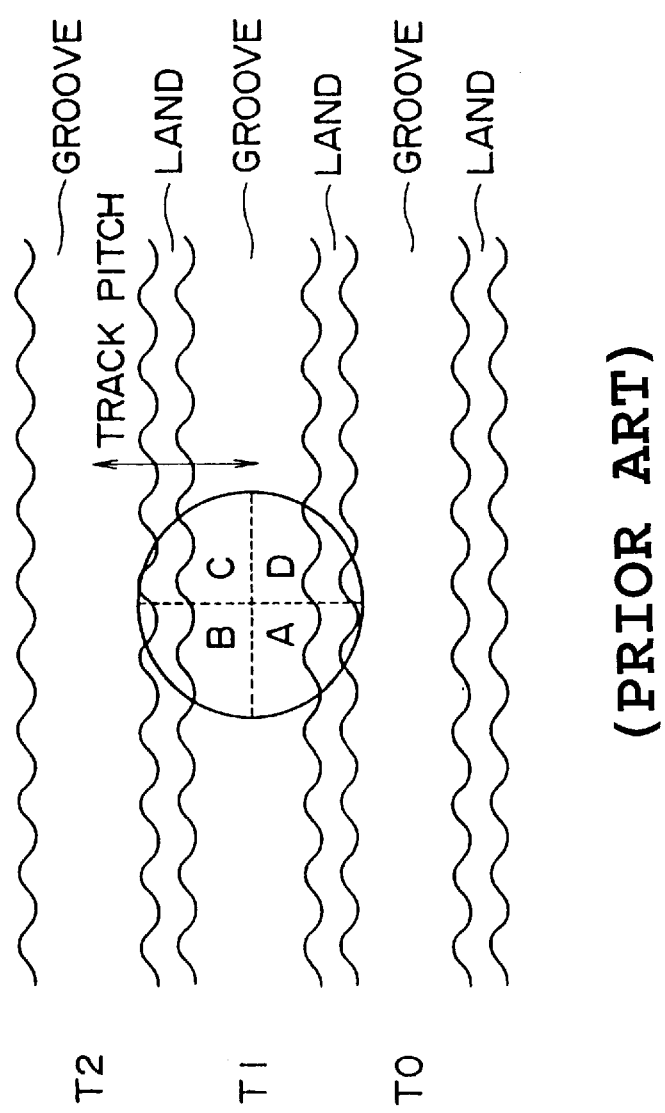

RECORDING MEDIUM, OPTICAL DISK APPARATUS AND METHOD OF INFORMATION RECORDING

BACKGROUND OF THE INVENTION

The present invention relates to a recording medium and an optical disk apparatus. More particularly, the invention relates to a recording medium such as an optical disk with address information retained relative to tracks where data are recorded and/or reproduced, and also to an optical disk apparatus for recording data on and/or reproducing the same from an optical disk where lands and grooves are formed alternately.

With the recent development and progress of multimedia, it has become possible to handle a great capacity of data inclusive of digital still pictures and motion pictures. Generally such data are stored in a recording medium like an optical disk having a predetermined mass capacity, and can be reproduced when required through random access thereto.

An optical disk is random-accessible and has a higher recording density as compared with a magnetic recording medium such as a floppy disk. Furthermore, a magneto-optical disk is also usable as a recording medium for the above purpose since it is adapted to rewrite the data stored therein.

Most of such magneto-optical disks have uneven portions termed grooves and lands in an information recording layer, wherein a carrier of a predetermined frequency is modulated by cluster numbers and sector numbers indicative of positions on the recording medium, and the shape of each groove is previously wobbled in accordance with the modulated signal, so that address information is retained with the edge shape of each groove. The method of recording address information by wobbling the edges is congenial to a disk where data recording or reproduction is performed at a constant linear velocity (CLV), and it is utilized well due to superior characteristics thereof including high reliability, low redundancy and minimal interference to a data area.

FIG. 17 shows an example of a related art disk having grooves wobbled as mentioned above. On this disk, data are recorded in grooves (which serve as tracks), and address information of each groove is retained at wobbled edges on both sides of the groove. More specifically, the left and right edges of each groove have the same address information representing the address of the inner groove. Therefore, in a data recording or reproduction mode, a laser beam is irradiated to the grooves as shown in FIG. 17 to record or reproduce data, and then the reflected beams from regions A to D of the laser beam are received independently of one another. Subsequently there is calculated the difference ((A+D)−(B+C)) between the sum (A+D) of the light amounts of the regions A and D on one side of the track and the sum (B+C) of the light amounts of the regions B and C on the other side of the track, and the shape of the wobbled edges is detected from the signal thus calculated, whereby the address information is read out.

Further in such a disk, each wobbled land or groove is formed in accordance with an FM signal obtained through frequency modulation of a disk-rotation control carrier signal by an address information signal. Therefore, in a disk replay mode, the shape of the land or groove is detected, then the address information is read out through frequency demodulation of the detection signal while the carrier signal is extracted, and the disk rotation is controlled in accordance with the carrier signal thus extracted.

Differing from such an address method which wobbles edges in the manner described, there exists another address method called a sampling servo method employed in a recording medium known as HS (Hyper Storage: trade name). According to this sampling servo method, pits (prepits) representing address information are formed previously at predetermined intervals along a track, and in writing or reading data, a reflected light beam from such prepits is detected to thereby read the address information.

Currently, relative to such a recording medium as an optical disk or a magneto-optical disk, the technique for enhancing the data recording density is in progress to realize recording of a greater amount of data thereon. For example, a study is now being advanced to achieve a higher recording density by narrowing the track pitch and increasing the linear density in the direction along tracks.

However, in recording an address on a CLV disk by wobbling an edge, the shape of the wobbled edge is not synchronous with (different in phase from) the shape of the wobbled edge of the adjacent groove (track). (In FIG. 17, the edges are drawn in synchronism with each other for the convenience of explanation, but on an actual disk, the edges are not synchronous mutually.) Therefore, when the track pitch (track-to-track interval) is narrowed, the signals including the address information read out from the edges are interfered by the other edges to consequently cause crosstalk, whereby reading the address is rendered difficult.

If the track pitch is narrow in FIG. 17 for example, there arises a problem that, when reading out address information from a track T1, a laser beam is irradiated onto, in addition to the two edges of the target track T1 (having address information of track T1), one edge of an inner track T0 (adjacent to track T1 and having address information of track T0) and one edge of an outer track T2 (adjacent to track T1 and having address information of track T2), so that these two edges (one edge of track T0 and one edge of track T2) cause crosstalk to consequently render difficult the reading of the address of the target track T1.

Accordingly, it becomes impossible to narrow the track pitch to eventually fail in enhancing the recording density.

Meanwhile in the sampling servo method, prepits need to be formed at predetermined intervals in each track, so that the area usable for tracks is reduced to bring about a problem of decreasing the recording capacity.

SUMMARY OF THE INVENTION

It is therefore an object of the present invention to realize proper reading of address information despite a narrowed track pitch by recording the address information merely in odd-numbered or even-numbered tracks to lengthen the distance between wobbled edges where different pieces of address information are included, thereby suppressing any crosstalk between the edges to consequently attain exact reading of the address information even in the case of a narrowed track pitch.

According to a first aspect of the present invention, there is provided a recording medium with address information retained relative to tracks where data are recorded and/or reproduced. This recording medium is so composed that lands and grooves are arranged alternately, and either the lands or the grooves constitute the tracks, wherein the wobbled grooves and the non-wobbled DC grooves are arranged alternately while each of the lands is interposed therebetween.

According to a second aspect of the present invention, there is provided a recording medium with address information retained relative to tracks where data are recorded and/or reproduced. This recording medium is so composed that lands and grooves are arranged alternately, and the lands constitute the tracks, wherein the wobbled grooves having address information and the non-wobbled DC grooves are arranged alternately while each of the lands is interposed therebetween, and the mutually adjacent tracks with the wobbled groove interposed therebetween share the address information of the intermediate groove.

According to a third aspect of the present invention, there is provided a method of recording information on a recording medium where lands and grooves are formed alternately. This method comprises the step of alternately arranging the grooves, which are wobbled on the basis of address information, and the non-wobbled DC grooves while interposing each of the lands therebetween.

According to a fourth aspect of the present invention, there is provided a recording medium wherein lands and grooves are arranged alternately in such a manner that either the lands or the grooves constitute data recording areas, and the wobbled grooves and the nonwobbled DC grooves are arranged alternately.

According to a fifth aspect of the present invention, there is provided an optical disk apparatus for recording data on and/or reproducing the same from an optical disk where lands and grooves are formed alternately. This apparatus comprises an irradiator means for irradiating a first light beam spot to a target track on the optical disk where the grooves, which are wobbled on the basis of address information, and non-wobbled DC grooves are formed alternately while each of the lands is interposed therebetween, and either the lands or the grooves constitute data recording and/or reproducing tracks, the irradiator means further irradiating second and third light beam spots to the diametrical two sides of the center light beam spot; a light beam receiver means for receiving the reflections of the first, second and third light beam spots from the optical disk, to thereby obtain first, second and third signals; and a calculator means for calculating an address signal on the basis of the second and third signals.

And according to a sixth aspect of the present invention, there is provided an optical disk apparatus for recording data on and/or reproducing the same from an optical disk where lands and grooves are formed alternately. This apparatus comprises an irradiator means for irradiating a light beam spot to a target track on the optical disk where the grooves wobbled on the basis of address information and the non-wobbled DC grooves are formed alternately while each of the lands is interposed therebetween, and either the lands or the grooves constitute data recording and/or reproducing tracks; a light beam receiver means for receiving the reflection of the light beam spot from the optical disk; and a calculator means for calculating, on the basis of the output of the light beam receiver means, the address of the position where data are recorded and/or reproduced.

In the recording medium of the first aspect, the left and right edges of only one of two mutually adjacent tracks are wobbled correspondingly to address information shared by the two tracks. Therefore, the distance from the wobbled edge of a certain track to the other wobbled edge is rendered longer to consequently facilitate irradiation of a laser beam only to the edge of that track.

In the recording medium of the second aspect, the left and right edges of a non-recorded area between two mutually adjacent tracks are wobbled correspondingly to address information shared by the two tracks. Therefore, the distance from the wobbled edge of a certain track to the other wobbled edge is rendered longer to consequently facilitate irradiation of a laser beam only to the edge of that track, and the track pitch can be narrowed.

In the information recording method of the third aspect, the left and right edges of only one of two mutually adjacent tracks are wobbled to record the address information shared by the two tracks, hence realizing manufacture of a recording medium with a narrower track pitch.

In the recording medium of the fourth aspect, the left and right edges of a non-recorded area between two mutually adjacent tracks are wobbled to record address information shared by the two tracks, hence realizing manufacture of a recording medium with a narrower track pitch.

In the optical disk apparatus of the fifth aspect, a first light beam is irradiated to a first track for recording data therein or reproducing the same therefrom, and also a second light beam is irradiated to a wobbled edge of the first track or a second track along the center between the first and second tracks. Then the address of the position irradiated with the first beam is calculated on the basis of the amount of the reflection of the second beam from a recording medium, whereby the address information can be read properly even in the case of a narrower track pitch.

And in the optical disk apparatus of the sixth aspect, a light beam is irradiated along the center of a track so as to record or reproduce data, and then there are received the reflection of a first portion of the light beam irradiated to a wobbled edge of a recording medium, and also the reflection of a second portion of the light beam irradiated to a non-wobbled edge thereof. Subsequently the address of the position irradiated with the light beam is calculated on the basis of the amount of the received reflection of the first portion, whereby the address information can be read properly by the data recording/reproducing light beam even in the case of a narrower track pitch.

The above and other features and advantages of the present invention will become apparent from the following description which will be given with reference to the illustrative accompanying drawings.

BRIEF DESCRIPTION OF THE DRAWINGS

FIG. 17 is a plan view of an exemplary recording medium in the related art.

DESCRIPTION OF THE PREFERRED EMBODIMENTS

Figure 1:
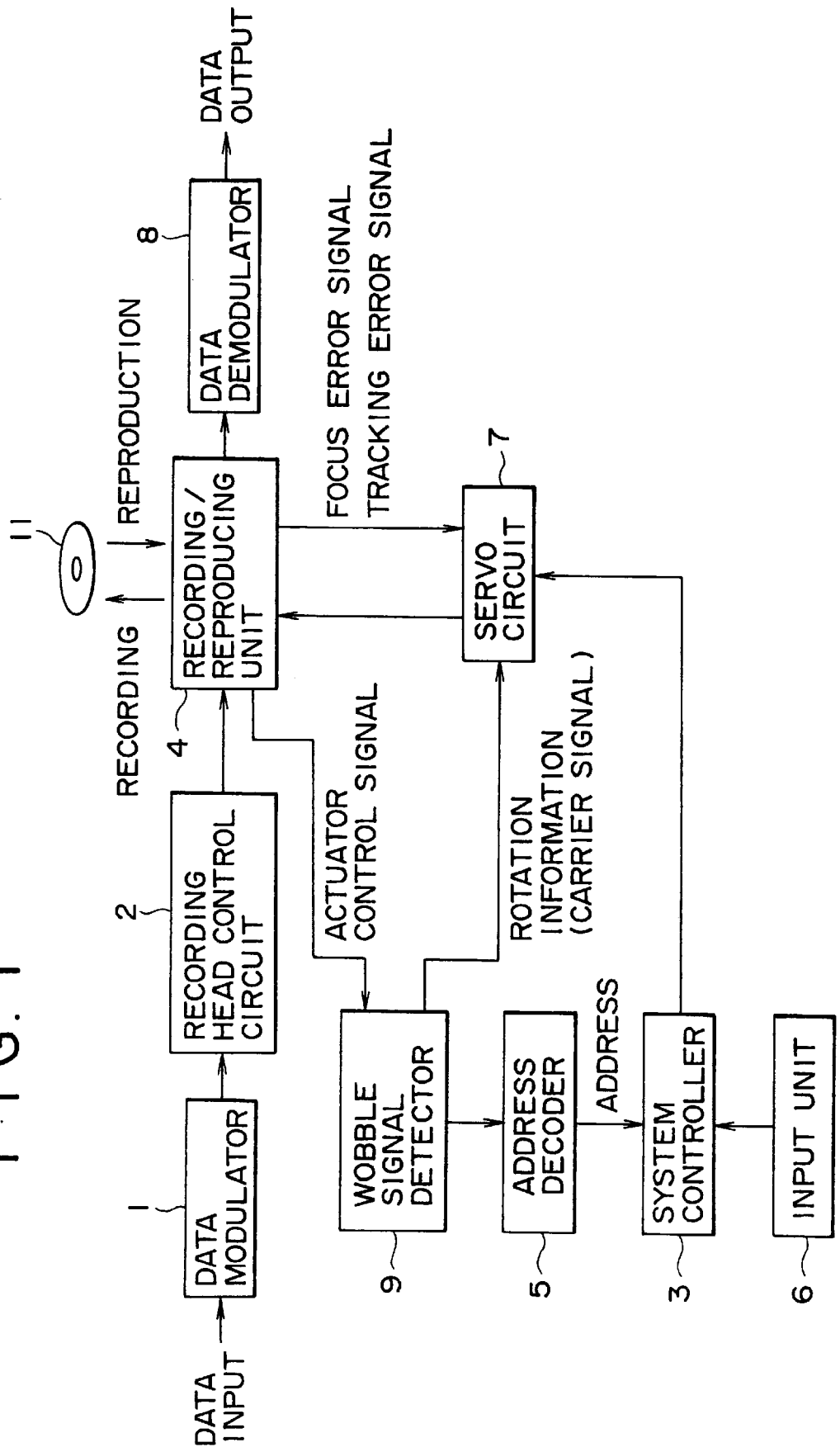
FIG. 1 is a block diagram of an embodiment representing a recording/reproducing apparatus of the present invention.

FIG. 1 is a block diagram of a first embodiment representing the optical disk apparatus of the present invention. In this embodiment, a data modulator 1 converts predetermined input data into a code of a predetermined format adapted to be recorded on a disk and then outputs the code to a recording head control circuit 2.

The recording head control circuit 2 supplies a control signal to a recording/reproducing head 21 (FIG. 2) in a recording/reproducing unit 4, so that the code supplied from the data modulator 1 is recorded on a disk 11 (recording medium such as magneto-optical disk).

The recording/reproducing unit 4 records the data (code) on the disk 11 under control of the recording head control circuit 2, and also performs other operations of irradiating a laser beam to the disk 11, receiving the reflection of the laser beam to thereby read out the data (code) recorded on the disk 11, outputting the data (code) thus read to a data demodulator 8, subsequently generating, from the received reflection of the laser beam, a tracking error signal, a focus error signal and a wobble signal which includes address information, and then outputting the tracking error signal and the focus error signal to a servo circuit 7 while outputting the wobble signal to a wobble signal detector 9 (discriminator means).

On the basis of the wobble signal supplied from the recording/reproducing unit 4, the wobble signal detector 9 makes a discrimination as to whether the track being currently recorded or reproduced is an odd-numbered track or an even-numbered track, and then outputs a discrimination result signal (track discrimination signal) to an address decoder 5 (calculator means). The wobble signal detector 9 further performs an operation of converting the wobble signal supplied from the recording/reproducing unit 4 into an address information signal and then outputting the same to the address decoder 5.

The wobble signal detector 9 performs another operation of extracting a carrier signal out of the wobble signal supplied from the recording/reproducing unit 4 and outputting the same to a servo circuit 7.

The address decoder 5 calculates an address from the address information signal and the track discrimination signal supplied thereto from the wobble signal detector 9, and then outputs the address to a system controller 3.

The system controller 3 outputs a predetermined control signal to the servo circuit 7 in accordance with the address supplied from the address decoder 5. And in response to a signal supplied from an input unit 6 and corresponding to a desired actuation, the system controller 3 outputs to the servo circuit 7 the control signal corresponding to the desired actuation, thereby controlling the recording/reproducing unit 4.

The servo circuit 7 controls a drive 22 (FIG. 2) of the recording/reproducing unit 4 in accordance with the focus error signal and the tracking error signal supplied from the recording/reproducing unit 4, thereby shifting the whole of an optical head 34 and an objective lens 45 thereof to adjust the focus and the tracking of a laser beam utilized for data detection.

The servo circuit 7 also controls a spindle motor 31 (FIG. 2) of the recording/reproducing unit 4 in accordance with rotation information obtained from the wobble signal detector 9, thereby rotating a disk 11 at a predetermined velocity. The servo circuit 7 further controls the recording/reproducing unit 4 in accordance with a control signal supplied from the system controller 3.

The data demodulator 8 demodulates the data (data detection signal) read out from the disk 11 by the recording/reproducing unit 4, hence restoring the original data.

Figure 2:
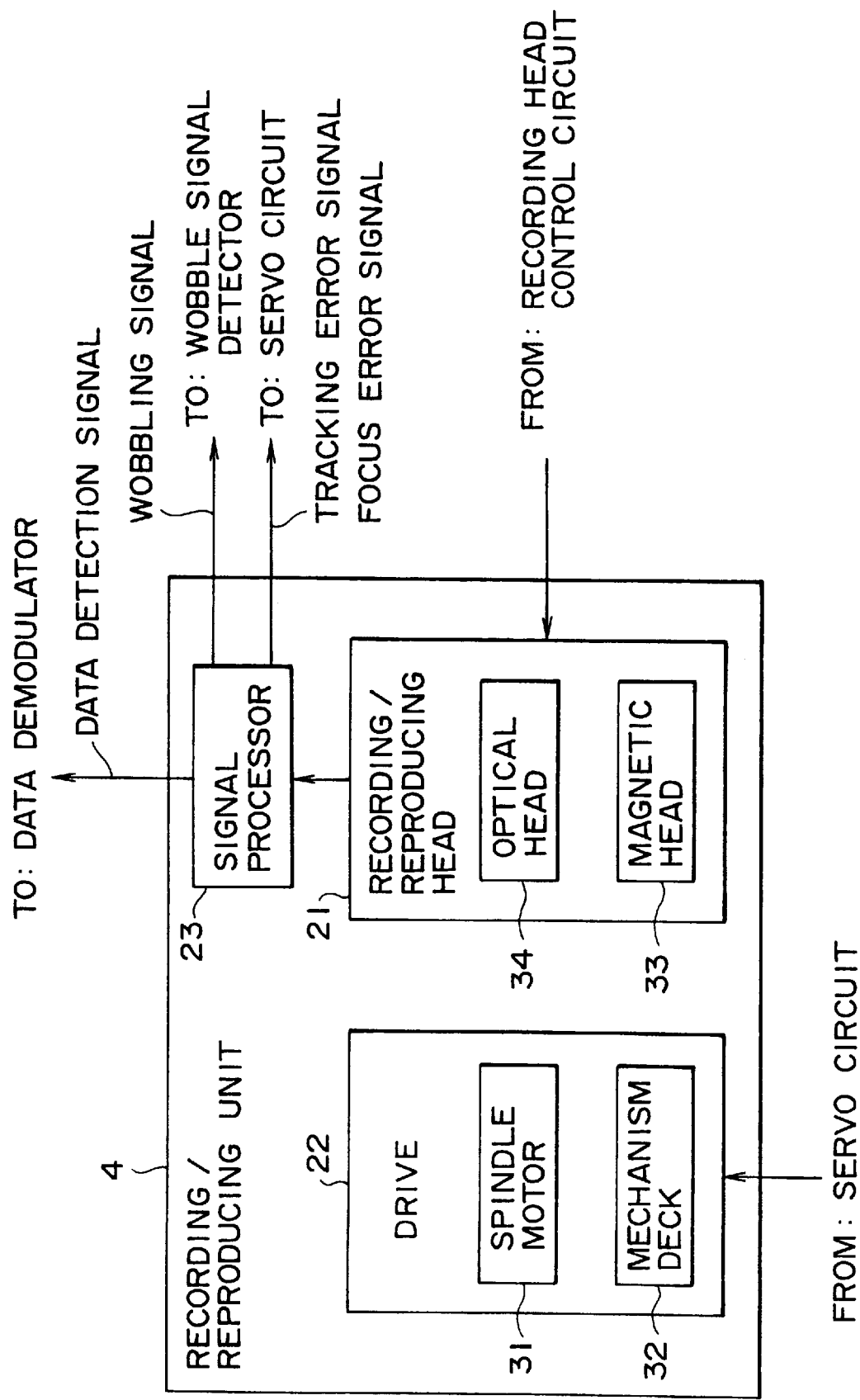
FIG. 2 is a block diagram showing a structural example of a recording/reproducing unit 4 included in FIG. 1.

FIG. 2 is a block diagram showing a structural example of the recording/reproducing unit 4. A magnetic head 33 and an optical head 34 constituting a recording/reproducing head 21 are operated in response to a control signal supplied from the recording head control circuit 2, and generate a magnetic field and a laser beam, respectively, to record predetermined data on the disk 11.

The optical head 34 irradiates a laser beam to the disk 11, then receives the reflection of the laser beam, and outputs to a signal processor 23 an electric signal proportional to the amount of the received reflection.

The drive 22 has a spindle motor 31 for rotating the disk 11 and a mechanism deck 32 for shifting the recording/reproducing head 21, and is operated in response to a control signal supplied from the servo circuit 7.

The signal processor 23 processes the signal obtained from the recording/reproducing head 21, then generates a data detection signal, a tracking error signal, a focus error signal and a wobble signal, and subsequently outputs the data detection signal to the data demodulator 8, the tracking error signal and the focus error signal to the servo circuit 7, and the wobble signal to the wobble signal detector 9, respectively.

Figure 3:
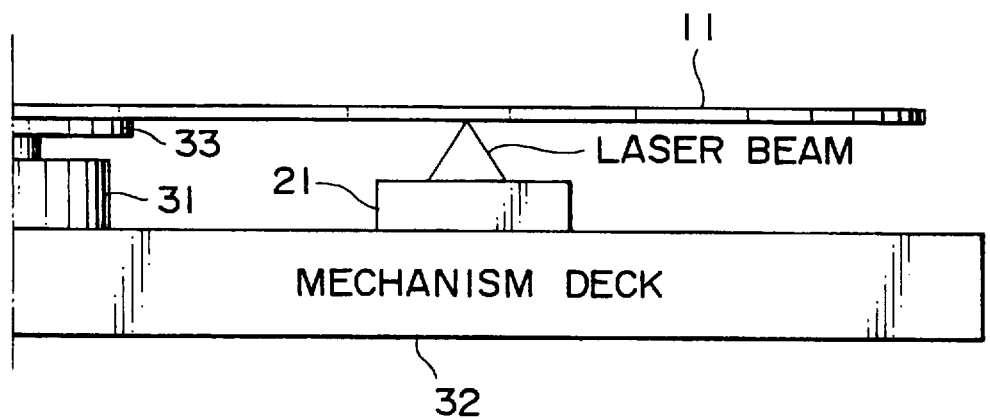
FIG. 3 is a sectional view showing a structural example of a drive 22 in FIG. 2.

FIG. 3 shows a structural example of the drive 22. The spindle motor 31 serves to rotate the disk 11 placed fixedly on a turntable 33. The mechanism deck 32 shifts the recording/reproducing head 21 in the radial direction of the disk 11 in response to a control signal obtained from the servo circuit 7.

Figure 4:
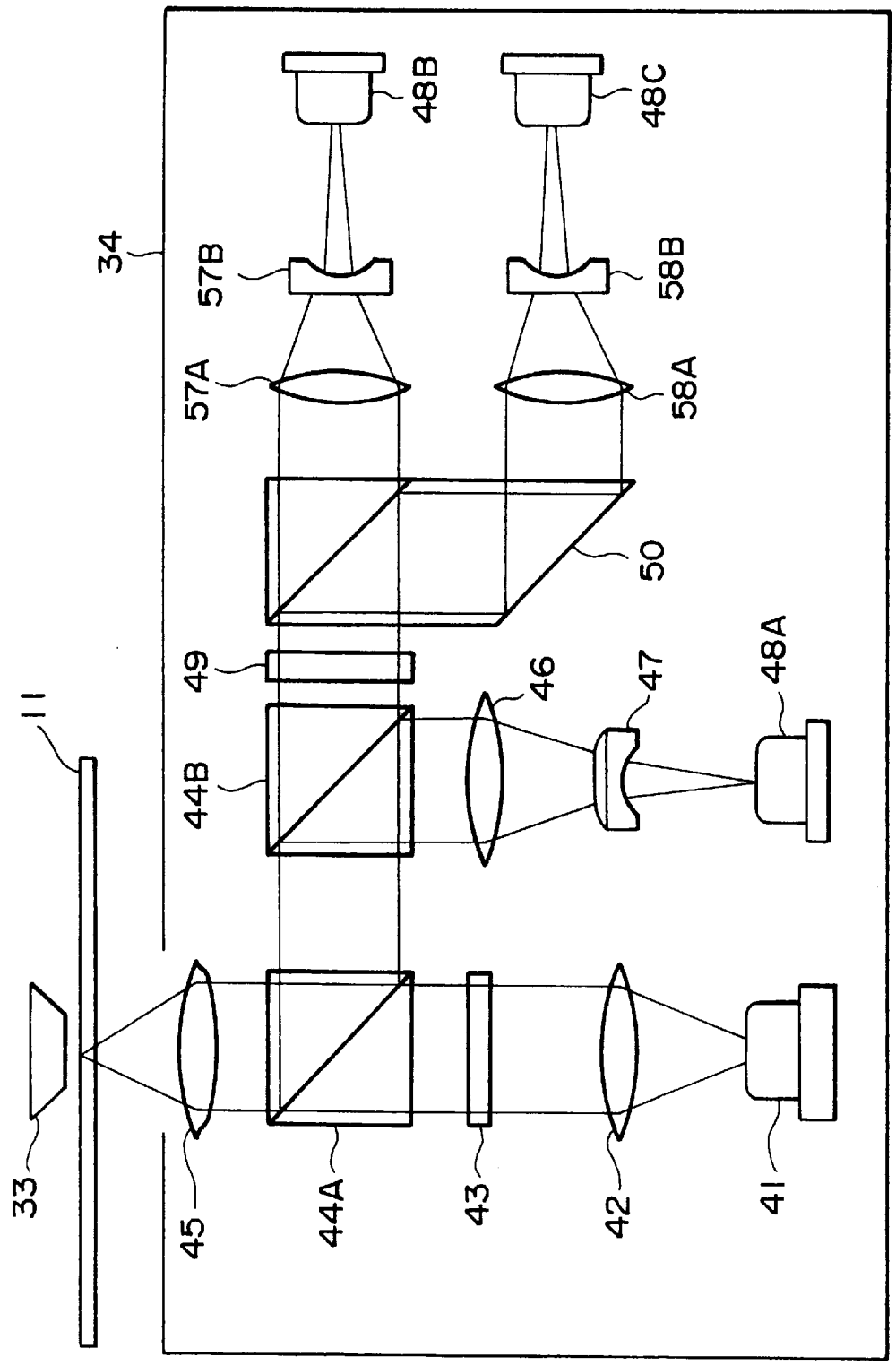
FIG. 4 is a sectional view showing a structural example of an optical head 34 in FIG. 2.

FIG. 4 shows a structural example of the recording/reproducing head 21. In this diagram, a laser diode 41 emits a red laser beam having a wavelength of 680 nm, which is then focused in a predetermined area of the recording layer of the disk 11 via a collimator lens 42, a grating 43, a beam splitter 44A and an objective lens 45 (irradiator means). The reflection of the laser beam from the disk 11 is incident upon the beam splitter 44A via the objective lens 45 again, so that a portion of the p-polarized beam component (e.g., 30 percent of p-polarized beam component) and the entirety of the s-polarized beam component are extracted and then are incident upon a beam splitter 44B. Subsequently a portion of the incident laser beam is caused to be incident upon a lens 46, while the remaining major portion thereof is caused to be incident upon a polarized beam splitter 50 via a half-wave plate 49. In the polarized beam splitter 50, the incident laser beam is separated into the s-polarized beam component and the p-polarized beam component, which are then caused to be incident upon a lens 57A and a lens 58A, respectively.

The laser beam outputted from the beam splitter 44A and incident upon the lens 46 is then caused to be incident upon a photo diode 48A via a lens 47 which gives astigmatism to the beam, whereby the beam is converted into an electric signal proportional to the intensity of the beam. This electric signal is outputted as a servo signal (focus error signal and tracking error signal) to the servo circuit 7. Meanwhile the laser beam outputted from the polarized beam splitter 50 is caused to be incident upon a photo diode 48B and a photo diode 48C via lenses 57A and 57B, and lenses 58A and 58B, respectively. These photo diodes 48B and 48C convert the incident laser beams into proportional electric signals and then output the same. The electric signals thus outputted from the photo diodes 48B and 48C are differentially amplified, and then the output is supplied as a data detection signal to the data demodulator 8.

Since the state of polarization of the return beam for data detection is changed in accordance with the recorded data, the data can be detected from the difference between the polarized beam components received by the photo diodes 48B and 48C.

The magnetic head 33 is disposed opposite to the objective lens 45 with the disk 11 positioned therebetween, and a magnetic field corresponding to the recording position is applied to the disk 11.

In this embodiment, three laser beams are disposed at predetermined intervals and are irradiated to the disk 11, wherein tracking servo control is executed by a differential push-pull (DPP) method with such three laser beams. One of the two outer laser beams (side beams) is used for reading out address information, while the center laser beam is used for focus servo control as well as for recording or reproduction of data.

It is also possible to execute three-spot tracking servo control by utilizing the two side beams out of the entire three laser beams. In this case, the difference between the amounts of the two return side laser beams is used as a tracking error signal.

Figure 5:
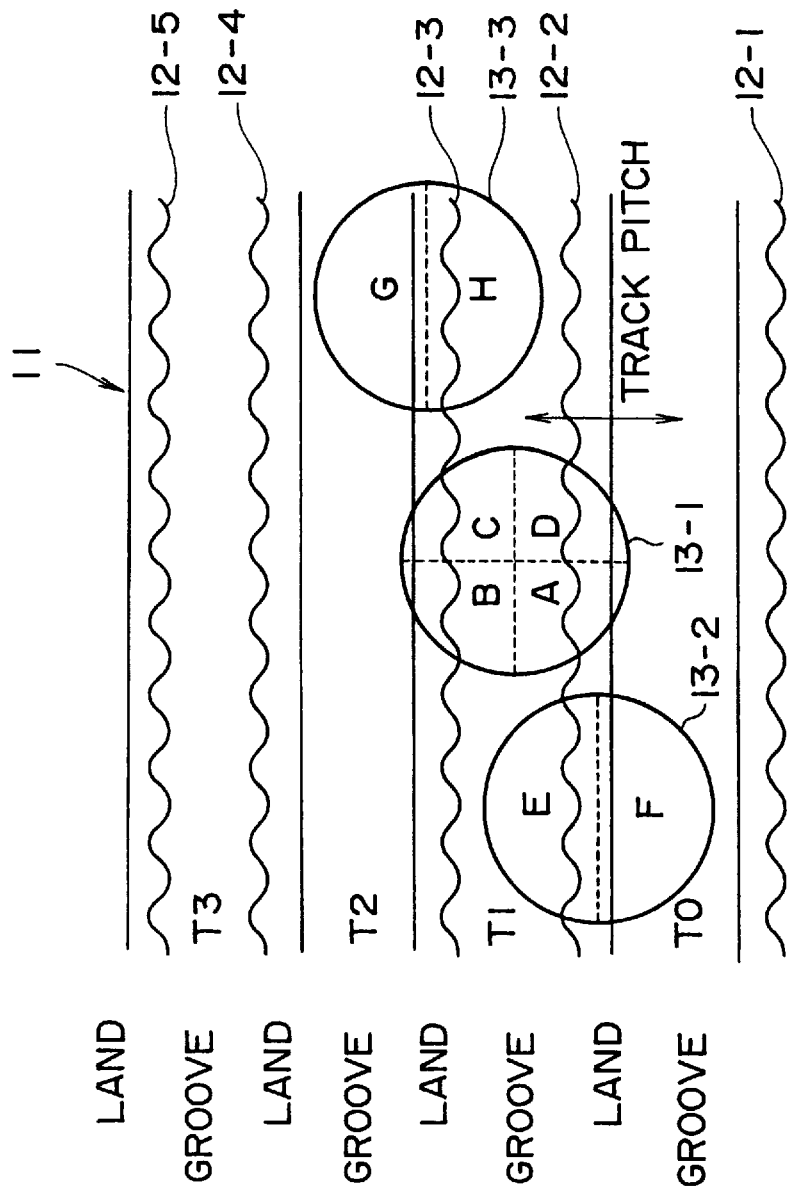
FIG. 5 is a plan view of an embodiment representing a recording medium of the present invention.

FIG. 5 shows an exemplary structural plan view of the disk 11 representing an embodiment of the recording medium of the present invention. The disk 11 has uneven portions termed grooves and lands which are formed spirally (or concentrically) in the circumferential direction. Either the grooves or the lands constitute tracks (recording areas) where data are recorded or reproduced, while the lands or the grooves not constituting the tracks form non-recorded areas. In the grooves or the lands constituting the tracks, left and right edges 12-1 to 12-5 of every other track are wobbled correspondingly to address information. Due to this arrangement, any one wobbled edge and the next wobbled edge of the other track are spaced apart from each other by a distance of more than one track pitch, so that the interference derived from the edge of the other track can be suppressed when the address information is read out from these edges.

Figure 6:
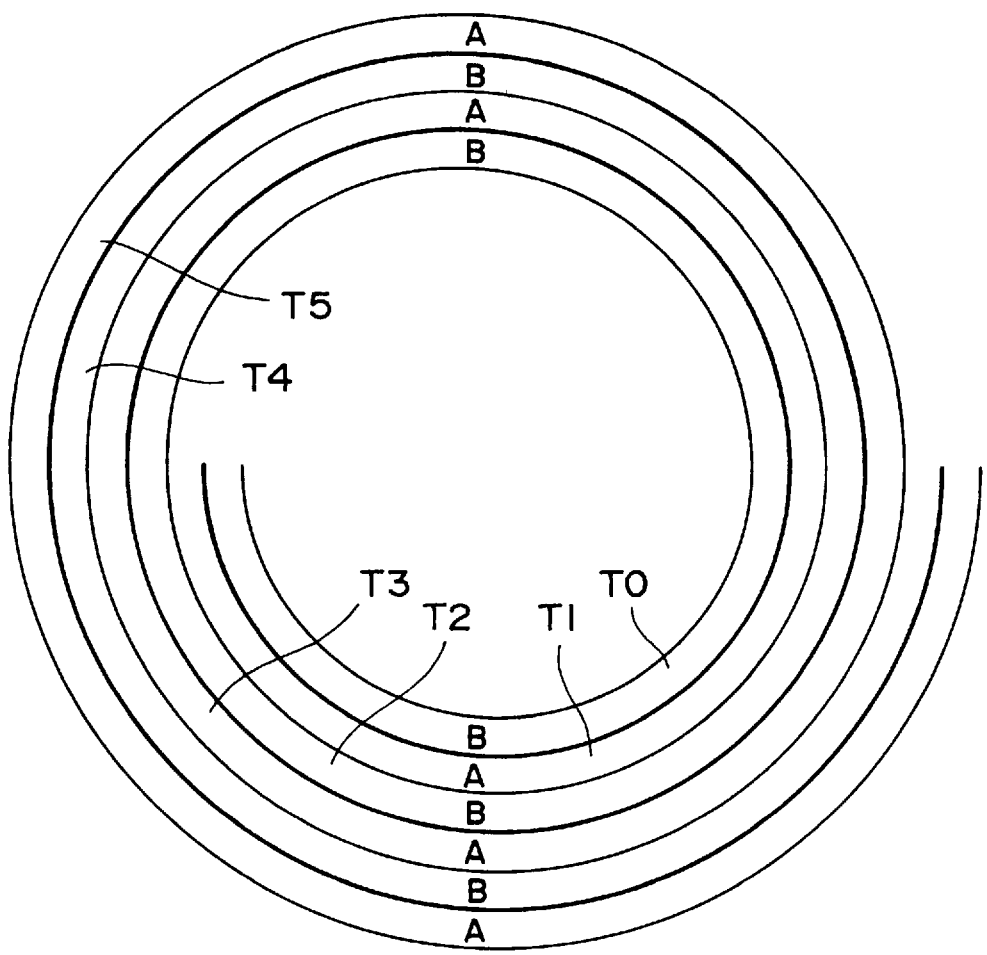
FIG. 6 illustrates the shapes of tracks on the recording medium of FIG. 5.

On this disk 11, there are formed double spiral tracks as illustrated in FIG. 6. More specifically, tracks are numbered as T0, T1, T2, T3 and so forth in this order sequentially from the innermost toward the outermost, in such a manner that odd-numbered tracks (tracks A) are mutually continuous in the order of track numbers but are independent of even-numbered tracks, and the even-numbered tracks (tracks B) are mutually continuous in the order of track numbers but are independent of the odd-numbered tracks. For example, track T0 is continuous with track T2, track T4, track T6 and so forth, while track T1 is continuous with track T3, track T5, track T7 and so forth.

Address information shared by the tracks T1 and T2 is retained in the shape of left and right edges 12-2 and 12-3 of the track T1, and address information shared by the tracks T3 and T4 (not shown) is retained in the shape of left and right edges 12-4 and 12-5 of the track T3.

In a modification, it is also possible to retain the address information of the track T1 alone in the shape of left and right edges 12-2 and 12-3 of the track T1 while retaining the address information of the track T3 alone in the shape of left and right edges 12-4 and 12-5 of the track T3 without recording the address information of the track T2 in any predetermined edge, and to calculate the same indirectly from the address information of the track T1 or that of the track T3. In this case, the address information is recorded only in the odd-numbered tracks, but none of address information is recorded in any even-numbered track.

Further, as shown in FIG. 5, a laser beam spot 13-1 for recording or reproducing data is so irradiated that its center is positioned at the center of a target track (e.g., track T1). Meanwhile, spots 13-2 and 13-3 of the two side laser beams (for detection of tracking error) are under DPP tracking servo control, so that each of these spots is irradiated to a position (between the tracks T0 and T1, or between the tracks T1 and T2) deviated by half the width of the track pitch toward the inside or outside of the disk 11. Then, the crosstalk can be suppressed since the spots 13-2 and 13-3 are not superposed on the wobbled edges (in this case, edges 12-1 and 12-4) of the other tracks.

For this purpose, the photo diode 48A in FIG. 4 has three light receiving parts 48-1 to 48-3 (FIG. 10) to receive the three beam spots 13-1 to 13-3, and detects the laser beam for focus error detection and also the two laser beams for tracking error detection. The light receiving part 48-1 to receive the laser beam for focus error detection is divided into four light receiving regions A to D. Since tracking error detection is executed by the DPP method, each of the light receiving parts 48-2 and 48-3 to receive the laser beams for tracking error detection is divided into two light receiving regions E and F or G and H.

These light receiving regions A to H are so formed as to receive the beams relative to the irradiation regions A to H of the spots 13-1 to 13-3 shown in FIG. 5. Regarding this point, a detailed explanation will be given later with reference to FIG. 10.

As mentioned, the two laser beams (side beams) for tracking error detection are irradiated to the edge 12-2 and the edge 12-3 along the center between the tracks T1 and T0 or along the center between the tracks T1 and T2 where data recording or reproduction is performed, and the return beams thereof are received by the photo diode 48A. And the shape of either the edge 12-2 or the edge 12-3 including the same address information is detected from the two return beams received by the photo diode 48A, so that the address information of the track T1 is read out.

Figure 7:
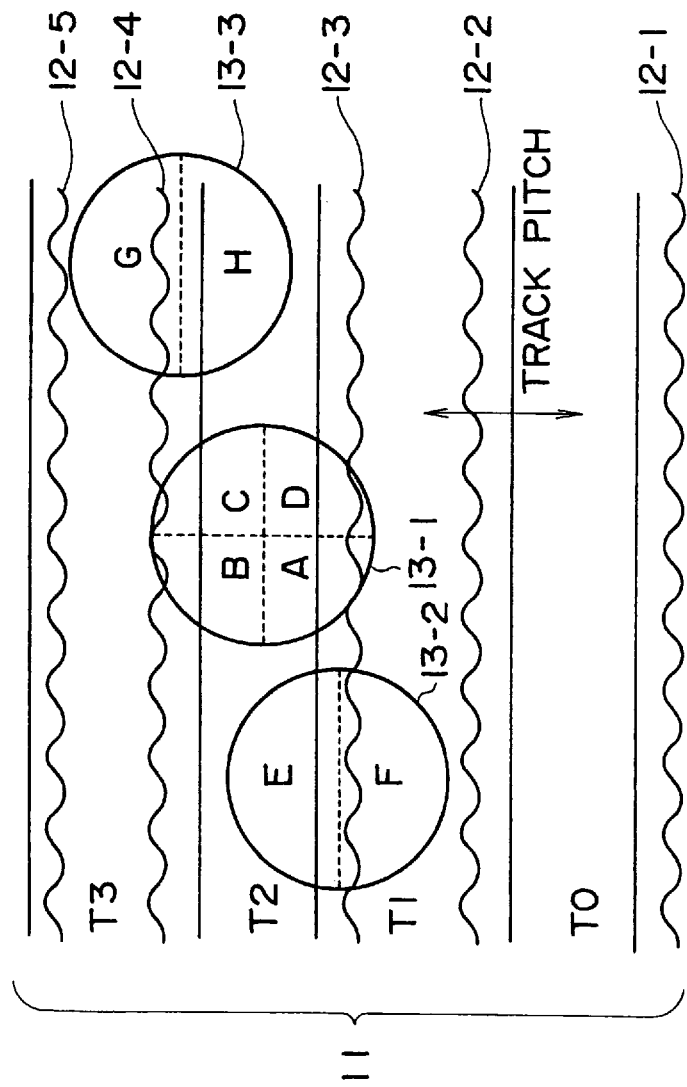
FIG. 7 illustrates exemplary positions of spots in a recording or reproduction mode on even-numbered tracks on the recording medium of FIG. 5.

When data recording or reproduction is performed in the track T2, as shown in FIG. 7, the laser beam spot 13-2 for tracking error detection is irradiated to the edge 12-3 along the center between the tracks T1 and T2, and the return beam thereof is received by the photo diode 48A. The shape of the edge 12-3 is detected from the return beam thus received, and the address information shared by the track T1 is calculated from the signal representing such shape.

In case the address information is shared by the track T3 (and the track T2), the address information can be acquired similarly by utilizing the laser beam spot 13-3.

Figure 8:
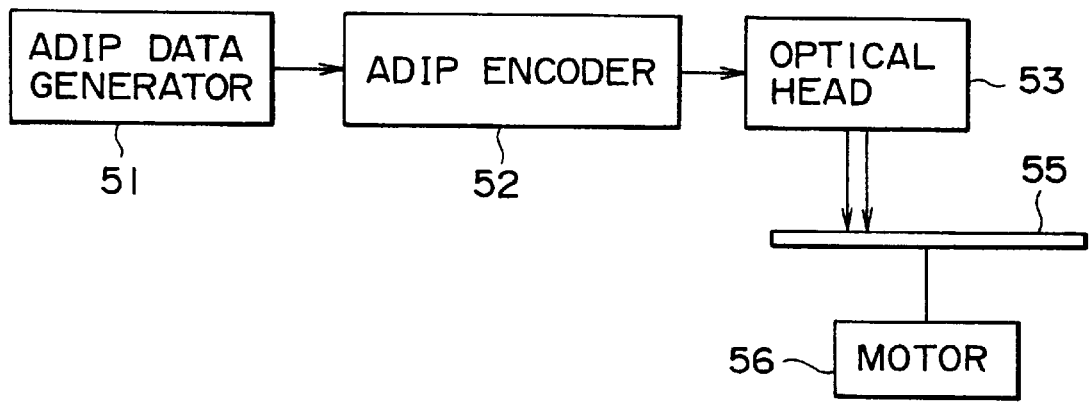
FIG. 8 is a block diagram of an embodiment representing an address recording device of the present invention.

FIG. 8 shows a structural example of an embodiment representing the address recording device of the present invention. An ADIP (Address in pre-groove) data generator 51 generates address data on the disk 11 (disk 55) and outputs such data to an ADIP encoder 52.

The ADIP encoder 52 executes biphase modulation with the address data supplied thereto, then frequency-modulates a carrier of a predetermined frequency with the modulation signal (biphase signal), and outputs the modulated signal (FM signal) to an optical head 53 (recording means).

The optical head 53 irradiates the laser beam to the disk 55 (master), which is coated with photoresist on its surface, while wobbling the laser beam in accordance with the modulated signal supplied thereto.

The disk 55 is coated with photoresist on its surface and is irradiated with the laser beam while being rotated at a predetermined rate by means of a motor 56. The surface of the disk 55 is thus exposed, in the wobbled shape corresponding to the address information, by the laser beam from the optical head 53. Thereafter the disk surface is developed to form wobbled grooves, and a land is formed between the grooves.

In this stage of the operation, the optical head 53 generates two laser beams and wobbles the first beam correspondingly to the address information to be recorded, thereby wobbling the two edges of each odd-numbered track. Meanwhile the optical head 53 positions the second beam inside of the first beam while leaving the second beam fixed (non-wobbled), whereby the two side edges of each inner adjacent even-numbered track are formed to be straight (circular).

The two beams are shifted in accordance with the rotation of the disk 55 in such a manner as to form a land between the locus (groove) of the first beam and that of the second beam, whereby tracks are so formed on the disk that, as shown in FIG. 5, the left and right edges 12-1 to 12-5 of every other track are wobbled.

A stamper is produced out of the disk 55 (with uneven portions of the surface), and further a multiplicity of disks 11 (replica disks) are manufactured out of such a stamper. In this specification, a portion formed as a result of the exposure is termed a groove, and a portion formed without the exposure (a portion formed as a result of such a groove) is termed a land.

In producing a stamper for manufacture of disks 11 in the manner described, a laser beam is irradiated to the disk 55 while being wobbled correspondingly to the address information, so that the address information is recorded in the edges of tracks. And the stamper obtained by transcribing the disk 55 is further transcribed to thereby manufacture a disk 11 where the edges of tracks are wobbled correspondingly to the address information.

Thus, as shown in FIG. 5, the address information of the track is recorded in the left and right edges 12-1 to 12-5 of every other track.

It is a matter of course that the above may be so modified as to wobble the edges of even-numbered tracks.

Figure 9:
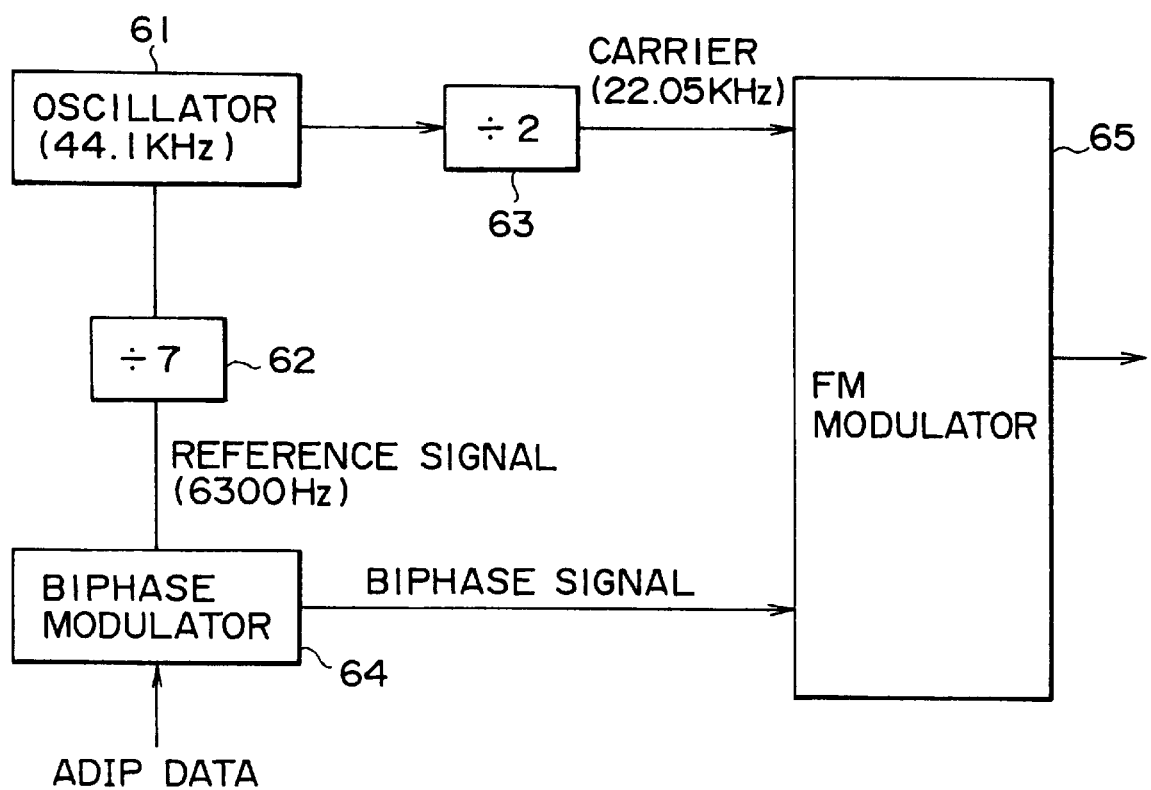
FIG. 9 is a block diagram showing a structural example of an ADIP encoder 52 in FIG. 8.

FIG. 9 shows a structural example of the ADIP encoder 52 in FIG. 8. An oscillator 6 generates a reference signal having a frequency of 44.1 kHz, and outputs the same to frequency converters 62 and 63.

The frequency converter 62 divides by seven the frequency of the reference signal supplied from the oscillator 61 and then outputs a reference signal of 6300 Hz to a biphase modulator 64. Meanwhile the frequency converter 63 divides by two the frequency of the reference signal supplied from the oscillator 61 and then outputs a carrier signal of 22.05 kHz to an FM modulator 65.

The biphase modulator 64 modulates the reference signal of 6300 Hz, which is supplied thereto from the frequency converter 62, with the address data supplied from the ADIP data generator 51, and then supplies the modulated signal (biphase signal) to the FM modulator 65.

The FM modulator 65 frequency-modulates the carrier signal, which is supplied thereto from the frequency converter 63, with the biphase signal supplied from the biphase modulator 64, and then outputs the modulated FM signal to the optical head 53.

In this manner, the ADIP encoder 52 modulates the address data (ADIP data) and outputs the FM signal thereof to the optical head 53.

Figure 10:
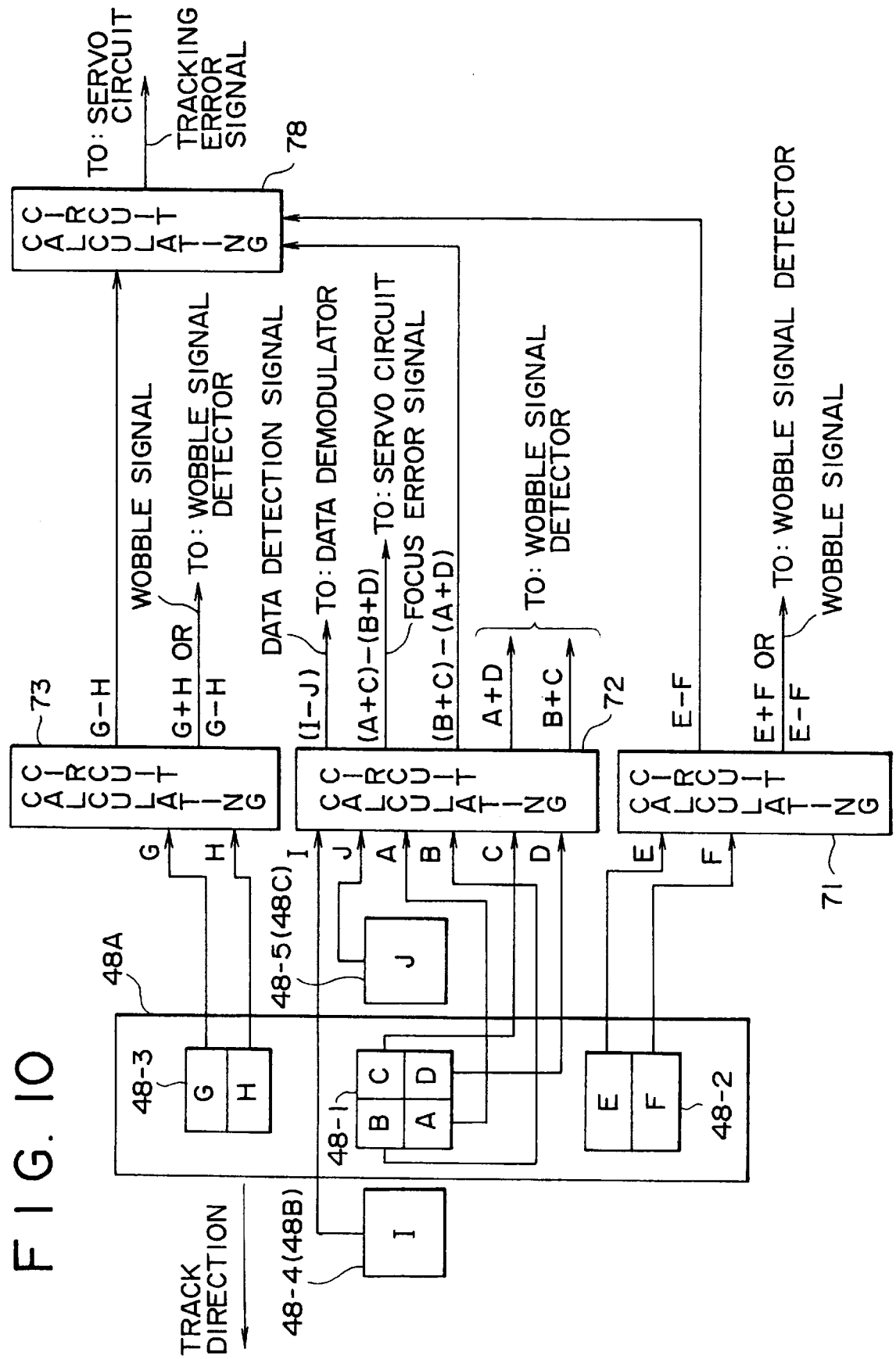
FIG. 10 is a block diagram showing a structural example of a signal processor 23 in FIG. 2.

FIG. 10 shows a structural example of the signal processor 23 in FIG. 2. A calculating circuit 71 is supplied with, from the light receiving part 48-2 of the photo diode 48A, electric signals E and F which correspond to the amounts of the light beams incident upon two regions E and F divided in the direction of tracks, then calculates the difference between the two signals, and outputs the result of such calculation (E−F) to a calculating circuit 78. The circuit 71 further calculates the sum of the two signals E and F, and then outputs the result of such calculation (E+F) to the wobble signal detector 9. In the case of executing tracking servo control by the DPP method, the calculating circuit 71 may be so formed as to output the difference (E−F) between the electric signals E and F to the wobble signal detector 9.

A calculating circuit 72 is supplied with, from the light receiving part 48-1 of the photo diode 48A, electric signals A, B, C and D which correspond to the amounts of the light beams incident upon four regions A to D divided in the direction of tracks and in the direction perpendicular thereto, and is further supplied with electric signals I and J which correspond to the amounts of the light beams incident upon the light receiving region I of the photo diode 48B and the light receiving region J of the photo diode 48C. Subsequently the circuit 72 calculates a data detection signal (I−J) on the basis of the electric signals thus supplied, and then outputs the detection signal to the data demodulator 8. The circuit 72 also calculates a focus error signal ((A+C)−(B+D)) and outputs the result of such calculation to the servo circuit 7.

The calculating circuit 72 further calculates, on the basis of the signals A, B, C and D supplied thereto, a signal ((B+C)−(A+D)) which corresponds to the tracking error in the light receiving part 48-1, and then outputs the result to a calculating circuit 78.

The calculating circuit 72 also calculates the sum of the signals A and D supplied thereto, and outputs the result (A+D) to the wobble signal detector 9. This circuit 72 further calculates the sum of the signals B and C supplied thereto, and outputs the result (B+C) to the wobble signal detector 9.

A calculating circuit 73 is supplied with, from the light receiving part 48-3 of the photo diode 48A, electric signals G and H which correspond to the amounts of the light beams incident upon two regions G and H divided in the direction of tracks, then calculates the difference between the signals, and outputs the result of such calculation (G−H) to the calculating circuit 78. The circuit 73 further calculates the sum of the two signals G and H, and then outputs the result of such calculation (G+H) to the wobble signal detector 9.

In the case of executing tracking servo control by the DPP method, the calculating circuit 73 may be so formed as to output the difference (G–H) between the electric signals G and H to the wobble signal detector 9.

Subsequently, on the basis of the output (E–F) of the calculating circuit 71, the output ((B+C)–(A+D)) of the calculating circuit 72 and the output (G–H) of the calculating circuit 73, the calculating circuit 78 calculates a tracking error signal ((B+C)–(A+D)–k((E–F)+(G–H)) (where k is a predetermined constant) in the DPP method, and then outputs this signal to the servo circuit 7.

In the case of executing tracking servo control by the three-spot method, spots 13-2 and 13-3 are disposed with an inward or outward deviation of ¼ track pitch from the spot 13-1, and the calculating circuit 71 outputs a signal (E+F) to the calculating circuit 78, while the calculating circuit 73 outputs a signal (G+H) to the calculating circuit 78. Subsequently the calculating circuit 78 calculates the difference between the output (E+F) of the calculating circuit 71 and the output (G+H) of the calculating circuit 73, and then delivers the result as a tracking error signal ((E+F)–(G+H) to the servo circuit 7.

In this manner, the signal processor 23 processes the signals obtained from the photo diodes 48A, 48B, 48C, and delivers the processed signals to predetermined circuits respectively.

Figure 11:
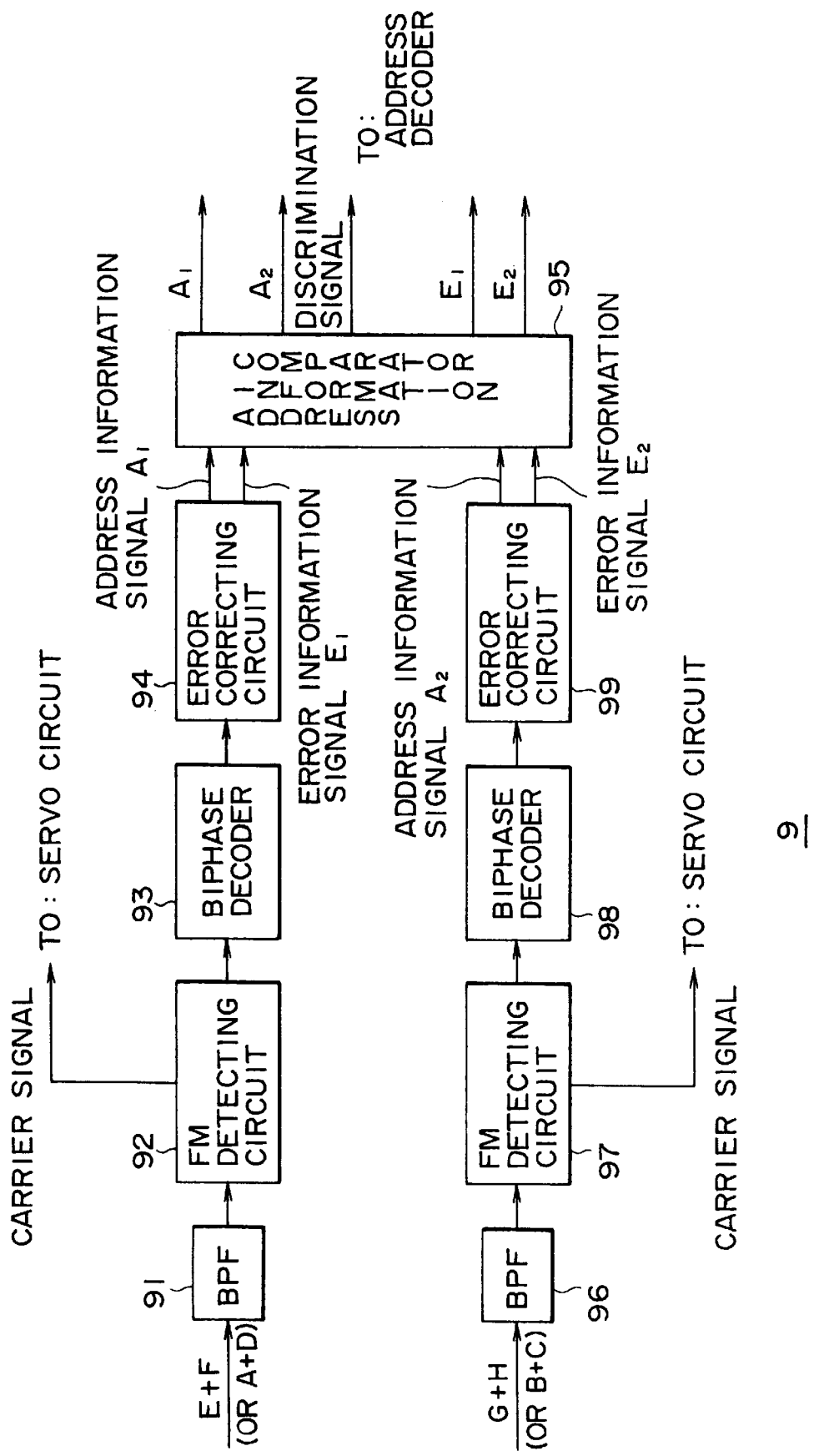
FIG. 11 is a block diagram showing a structural example of a wobble signal detector 9 in FIG. 1.

FIG. 11 shows a structural example of the wobble signal detector 9 in FIG. 1. A band pass filter (BPF) 91 extracts, out of the signal (E+F or E–F) supplied from the calculating circuit 71 in the signal processor 23, a frequency component of merely a predetermined band whose center frequency is, in this case, 22.05 kHz of the carrier signal used to produce a wobbled edge, whereby the signal without any unrequired signal component is outputted to an FM detecting circuit 92.

The FM detecting circuit 92 performs FM detection of the signal outputted from the BPF 91, thereby detecting the biphase signal and outputting the same to a biphase decoder 93. The circuit 92 further serves to extract the carrier signal out of the signal supplied from the BPF 91, and then outputs the extracted signal to the servo circuit 7.

The biphase decoder 93 decodes the output biphase signal of the FM detecting circuit 92 to form an address information signal, and then outputs this signal to an error correcting circuit 94.

The error correcting circuit 94 performs error correction of the address information signal supplied thereto from the biphase decoder 93, and then outputs to an address information comparator circuit 95 both of an error-corrected address information signal A1 and an error information signal E1 inclusive of the error correcting information.

A BPF 96 extracts, out of the signal (G+H or G–H) supplied from the calculating circuit 73 in the signal processor 23, a frequency component of merely a predetermined band whose center frequency is that of the carrier signal used to produce a wobbled edge, whereby the signal without any unrequired signal component is outputted to an FM detecting circuit 97.

The FM detecting circuit 97 performs FM detection of the signal outputted from the BPF 96, thereby detecting the biphase signal and outputting the same to a biphase decoder 98. The circuit 97 further serves to extract the carrier signal out of the signal supplied from the BPF 96, and then outputs the extracted signal to the servo circuit 7. The servo circuit 7 selects either the carrier signal obtained from the FM detecting circuit 92 or the carrier signal from the FM detecting circuit 97, and uses the selected signal which is more satisfactory with less harmful influence such as noise.

The biphase decoder 98 decodes the output biphase signal of the FM detecting circuit 97 to form an address information signal, and then outputs this signal to an error correcting circuit 99.

The error correcting circuit 99 performs error correction of the address information signal supplied thereto from the biphase decoder 98, and then outputs to the address information comparator circuit 95 both of an error-corrected address information signal A2 and an error information signal E2 inclusive of the error correcting information.

Referring to the error information signal E1 obtained from the error correcting circuit 94 and the error information signal E2 from the error correcting circuit 99, the address information comparator circuit 95 makes a decision as to whether the address information signal A1 from the error correcting circuit 94 is identical with the address information signal A2 from the error correcting circuit 99, (When the two signals have a phase deviation due to the positional deviation of a certain distance between the spots 13-2 and 13-3 in the track direction, the circuit 95 delays the preceding spot output correspondingly to such distance and makes a decision by comparing the two signals with each other). If the result of the above decision signifies that the two address information signals are identical with each other (as shown in FIG. 5), the track where recording or reproduction is being currently performed is regarded as a wobbled track (odd-numbered track in the case of FIG. 5). Meanwhile, if the result of the above decision signifies that the two address information signals are not identical with each other (as shown in FIG. 7), the track is regarded as a non-wobbled one (even-numbered track in the case of FIG. 7), and the decision result (track discrimination signal) is outputted, together with the address information signals A1 and A2, to the address decoder 5.

Thus, the wobble signal detector 9 performs discrimination between tracks on the basis of a wobble signal in the manner mentioned.

Hereinafter an explanation will be given on the operation of the above embodiment.

First in a data recording mode, when a predetermined manipulation is performed in the input unit 6, the system controller 3 supplies a predetermined signal to the servo circuit 7 in response to such manipulation, and then the servo circuit 7 controls the recording/reproducing unit 4 in response to the supplied signal, thereby starting rotation of the disk 11 and irradiation of a laser beam, and subsequently executing detection of a tracking error signal, a focus error signal and a wobble signal.

The tracking error signal and the focus error signal detected by the recording/reproducing unit 4 are outputted to the servo circuit 7, which then supplies a predetermined control signal to the drive 22 in accordance with the input signals and executes focus servo control and tracking servo control.

Meanwhile the wobble signal detected by the recording/reproducing unit 4 is supplied to the wobble signal detector 9, which then converts the wobble information signal into an address information signal and outputs the converted signal to the address decoder 5.

The address decoder 5 calculates the corresponding address on the basis of the address information signal supplied thereto, and outputs the address to the system controller 3.

The system controller 3 actuates the drive 22 in the recording/reproducing unit 4 with reference to the input address, and then instructs the servo circuit 7 to move the magnetic head 33 and the optical head 34 to desired positions thereof for recording the data.

When the magnetic head 33 and the optical head 34 have been moved to the data recording positions thereof, the system controller 3 instructs the recording head control circuit 2 to record the data (code).

Subsequently the recording head control circuit 2 controls the magnetic head 33 to record the data (code) in the track on the disk 11.

Thus, the data are recorded on the disk 11.

Thereafter in a data reproduction mode, when a predetermined manipulation is performed in the input unit 6, the system controller 3 supplies a predetermined signal to the servo circuit 7 in response to such manipulation, and then the servo circuit 7 controls the recording/reproducing unit 4 in response to the supplied signal, thereby starting rotation of the disk 11 and irradiation of a laser beam, and subsequently executing detection of the tracking error signal, the focus error signal and the wobble signal.

The tracking error signal and the focus error signal detected by the recording/reproducing unit 4 are outputted to the servo circuit 7, which then supplies a predetermined control signal to the drive 22 in accordance with the input signals and executes focus servo control and tracking servo control.

Meanwhile the wobble signal detected by the recording/reproducing unit 4 is supplied to the wobble signal detector 9, which then converts the wobble information signal into an address information signal and outputs the converted signal to the address decoder 5.

The address decoder 5 calculates the corresponding address on the basis of the address information signal supplied thereto, and outputs the address to the system controller 3.

The system controller 3 actuates the drive 22 in the recording/reproducing unit 4 with reference to the input address, and then instructs the servo circuit 7 to move the optical head 34 to its desired positions for reproducing the data.

With such movement to the data reproducing position and execution of each servo control, a data detection signal obtained from the recording/reproducing unit 4 is outputted to the data demodulator 8, which then demodulates the data detection signal to the former data and outputs the same therefrom.

In this manner, the data are reproduced from the disk 11.

As described above, with discrimination between the tracks, the address information is read out from the disk 11 where the left and right edges of grooves or lands arranged to form tracks are wobbled, in every other track, correspondingly to the address information.

Figure 12:
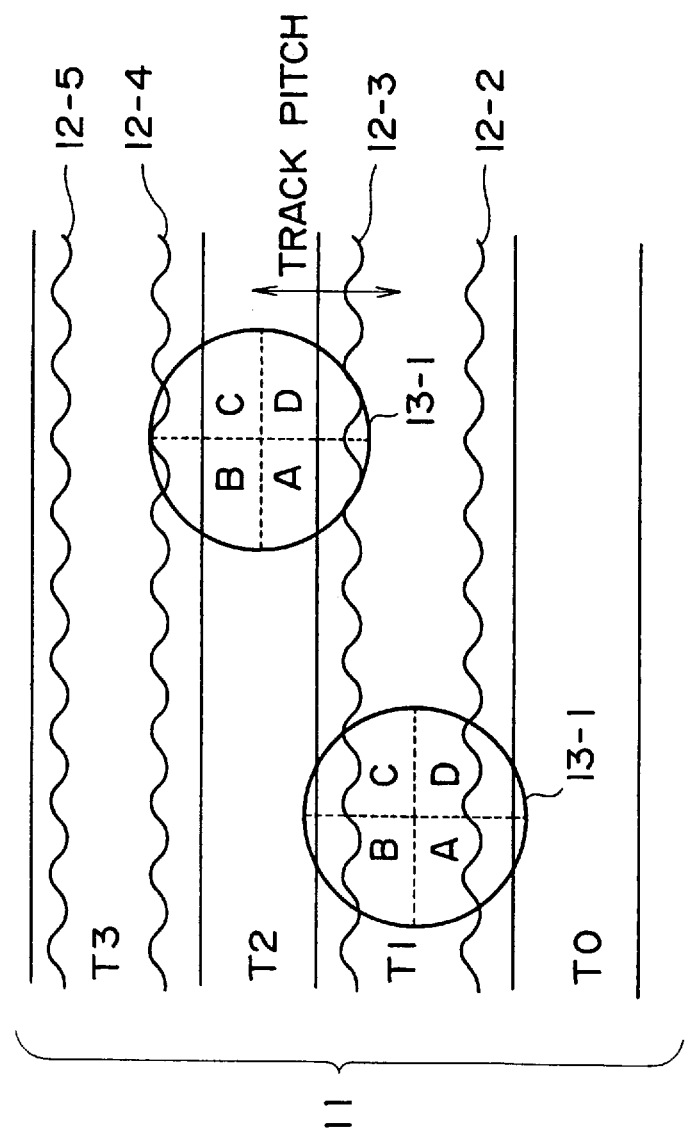
FIG. 12 illustrates how address information in the recording medium is read out by the use of a data recording/reproducing laser beam.

FIG. 12 illustrates how the address information is read out from the disk 11 by using, instead of side beam spots 13-2 and 13-3, a data recording/reproducing laser beam spot 13-1.

When the address information is read by the use of a data recording/reproducing laser beam, the data recording/reproducing laser beam spot 13-1 is so irradiated that, in a track T1 having wobbled edges 12-2 and 12-3, its irradiation regions A and D include the wobbled edge 12-2 while its irradiation regions B and C include the wobbled edge 12-3.

Meanwhile in a track T2 having none of wobbled edges, the data recording/reproducing laser beam spot 13-1 is so irradiated that its irradiation regions A and D include the wobbled edge 12-3 of the inner adjacent track T1 while its irradiation regions B and C include the wobbled edge 12-4 of the outer adjacent track T3.

The address is read by using the beam corresponding to the irradiation regions A and D instead of the beam corresponding to the irradiation regions E and F, and also by using the beam corresponding to the irradiation regions B and C instead of the beam corresponding to the irradiation regions G and H shown in FIG. 5. In the wobble signal detector 9, the address is read by using the signal (A+D) from the calculating circuit 72 instead of the signal (E+F or E−F) from the calculating circuit 71, and also by using the signal (B+C) from the calculating circuit 72 instead of the signal (G+H or G−H) from the calculating circuit 73.

In this manner, the address reading is executed by using the data recording/reproducing laser beam. According to the above technique that executes the address reading operation by using the data recording/reproducing laser beam, the tracking servo control is not restricted particularly to any specific method.

Figure 13:
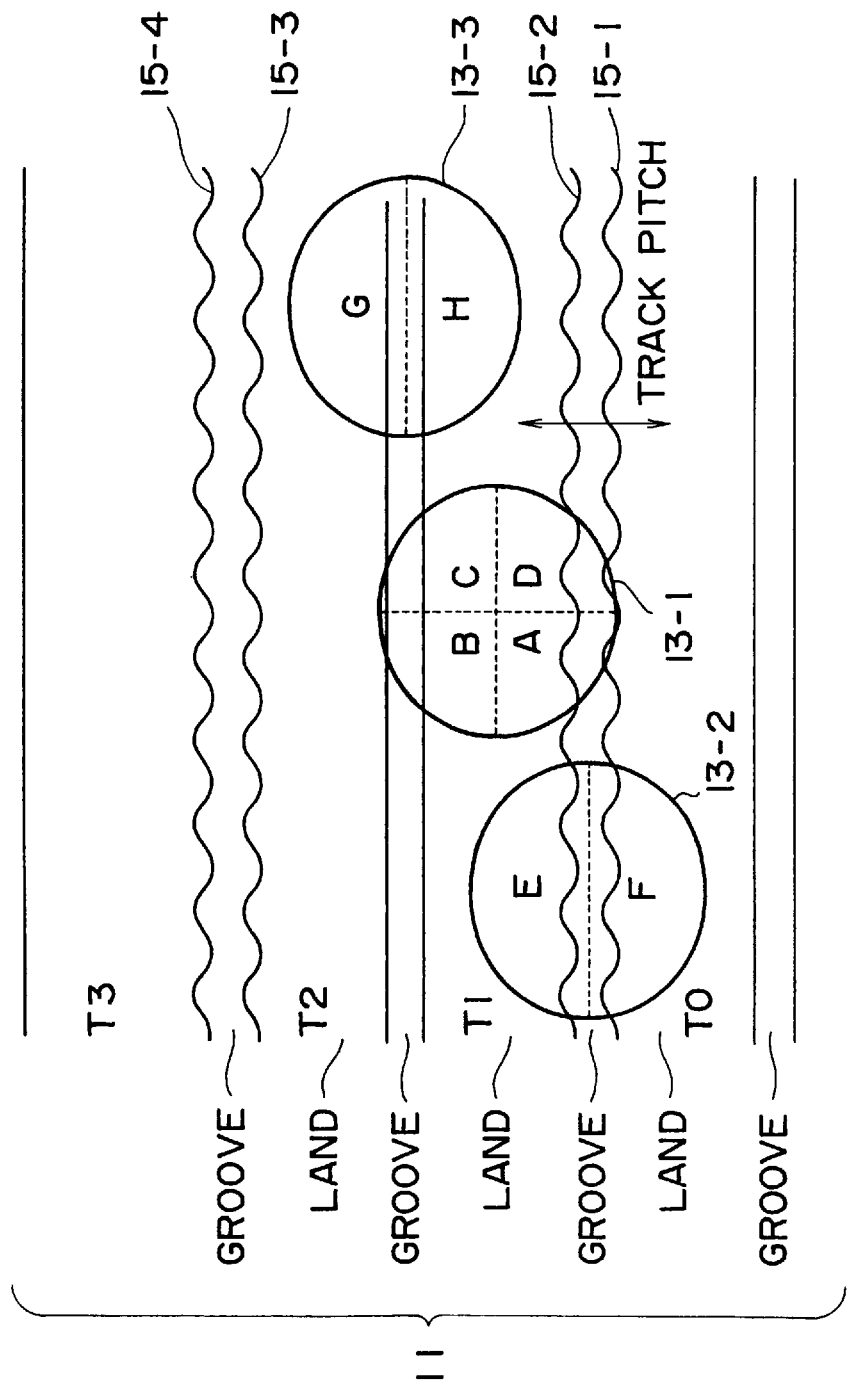
FIG. 13 is a plan view of another embodiment representing the recording medium of the present invention.

FIG. 13 is a plan view of a structural example representing another embodiment of the disk 11 in the present invention. In this embodiment, each track (recorded area) is composed of a land, and its address is recorded by wobbling the left and right edges of an inner adjacent groove (non-recorded area).

For example, address information shared by a track (land) T0 and an adjacent outer track (land) T1 is retained in the shape of left and right edges 15-1 and 15-2 of a groove (non-recorded area) positioned between the two tracks T0 and T1. Address information shared by a track (land) T2 and an adjacent outer track (land) T3 is retained in the shape of left and right edges 15-3 and 15-4 of a groove positioned between the two tracks T2 and T3.

In a modification, it is also possible to retain the address information of the track T1 alone in the edges 15-1 and 15-2 while retaining the address information of the track T3 alone in the edges 15-3 and 15-4, and to calculate the address information of the tracks T0 and T2 indirectly on the basis of the address information of the tracks T1 and T3 respectively.

In the embodiment of FIG. 13, a spot 13-1 of a data recording/reproducing laser beam is so irradiated that its center is positioned at the center of a target track (e.g., track T1). Meanwhile, spots 13-2 and 13-3 of two side laser beams (tracking-error detecting laser beams) are under DPP tracking servo control, so that each of these spots is irradiated to a position (between tracks T0 and T1, or between tracks T1 and T2) deviated by half the width of the track pitch toward the inside or outside of the disk 11. Then, the crosstalk can be suppressed since the spots 13-2 and 13-3 are not superposed on the wobbled edges (in this case, edges 15-3 and so forth) of the other tracks.

In a modification, the tracking servo control can be executed also by a three-spot system with the use of two side laser beams out of the entire three beams. In this case, a tracking error signal is obtained from the difference between the amounts of the reflections of the two side laser beams.

As mentioned, in this embodiment, spots 13-2 and 13-3 of the two laser beams (side beams) for tracking error detection are irradiated to the edges 15-1, 15-2 and the edges between the tracks T1 and T2 along the center between the track T1, where data recording or reproduction is performed, and the adjacent inner track T0 or the adjacent outer track T2, and then the return beams thereof are received by the photo diode 48A. The shapes of the edges 15-1 and 15-2 are detected by the spot 13-2, so that the address information of the track T1 is read out.

Figure 14:
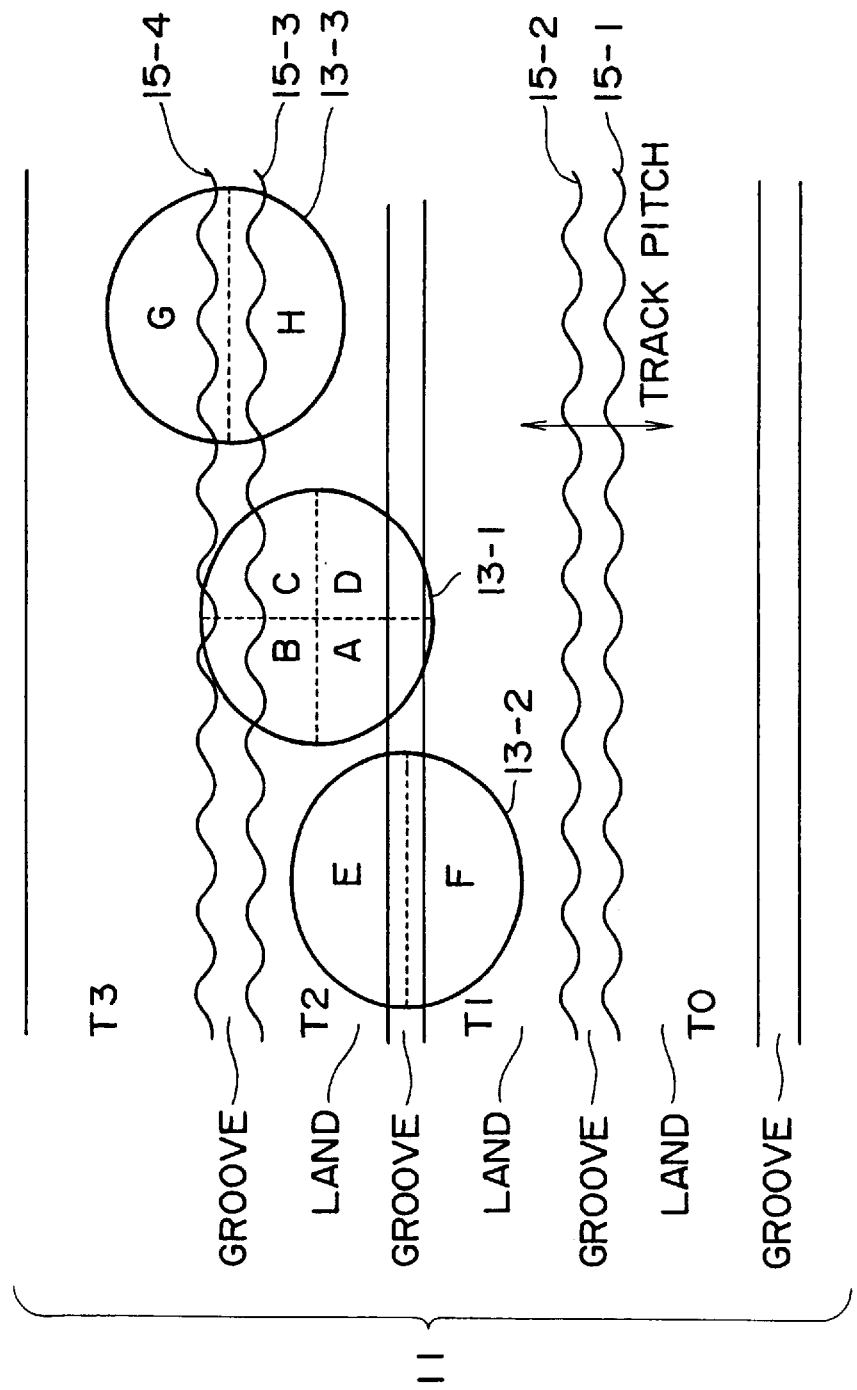
FIG. 14 illustrates exemplary positions of spots in a recording or reproduction mode on even-numbered tracks on the recording medium of FIG. 13.

When data recording or reproduction is performed in the track T2, as shown in FIG. 14, the laser beam spots 13-2 and 13-3 for tracking error detection are irradiated to the edges between the tracks T1 and T2 and to the edges 15-3 and 15-4 along the center between the tracks T1 and T2 and between the tracks T2 and T3. The address information of the track T2 shared with the track T3 is read out from the shapes of the edges 15-3 and 15-4 by the laser beam spot 13-3 irradiated between the tracks T2 and T3.

The disk 11, where the left and right edges of grooves (non-recorded areas) not constituting tracks are wobbled in every other track correspondingly to address information as described, is produced by utilizing the address recording device shown in FIG. 8, similarly to the aforementioned disk of FIG. 5.

In producing such disk, the first one of two beams (laser light beams) is meandered by the optical head 53 correspondingly to the address information to be recorded, so that the edges of the groove between the tracks are wobbled. Further the second beam is positioned on the outer side of the first beam and is held fixed (not wobbled), so that the left and right edges of the groove between the tracks are shaped to be straight (circular).

The two beams are moved in accordance with the rotation of a disk 55 in such a manner that a track (land) is formed between the locus (groove) of the first beam and the locus (groove) of the second beam, thereby producing a disk where, as shown in FIG. 13, grooves are formed with the left and right edges thereof 15-1 to 15-4 wobbled in every other track.

In a modification, it is also possible to form grooves as tracks and to wobble the left and right edges of lands.

Next, referring to FIG. 15, an explanation will be given on an embodiment of the wobble signal detector 9 in the optical disk apparatus which records data on and/or reproduces the same from the disk 11 where, as shown in FIG. 13, the left and right edges of grooves not constituting tracks are wobbled in every other track correspondingly to address information.

Figure 15:
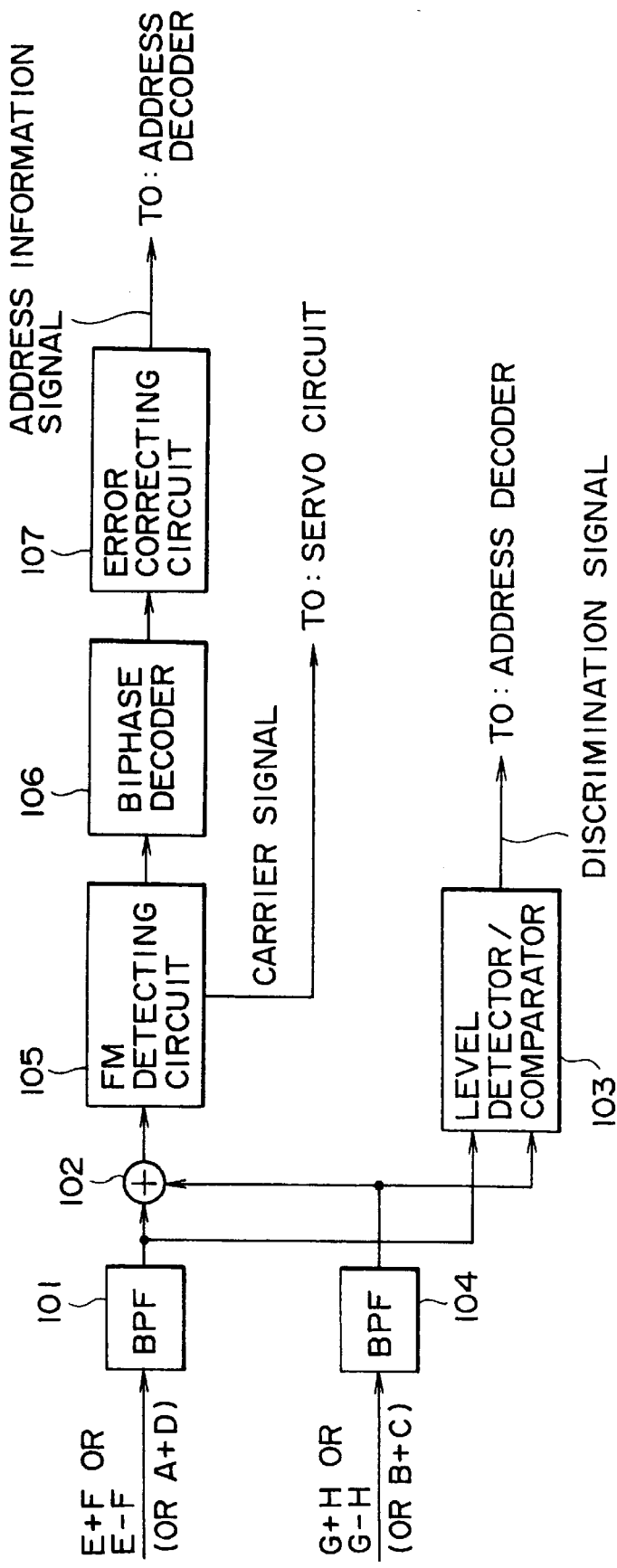
FIG. 15 is a block diagram showing a structural example of a wobble signal detector 9 employed in the embodiment which records data on and/or reproduces the same from the recording medium of FIG. 13.

In FIG. 15, a BPF 101 extracts, out of the signal (E+F or E−F) supplied from the calculating circuit 71 in the signal processor 23, a frequency component of merely a predetermined band whose center frequency is that of the carrier signal used to produce a wobbled edge, whereby the signal without any unrequited signal component is outputted to an adder 102 and a level detector/comparator 103.

A BPF 104 extracts, out of the signal (G+H or G−H) supplied from the calculating circuit 73 in the signal processor 23, a frequency component of merely a predetermined band whose center frequency is that of the carrier signal used to produce a wobbled edge, whereby the signal without any unrequited signal component is outputted to the adder 102 and the level detector/comparator 103.

The adder 102 calculates the sum of the output of the BPF 101 and that of the BPF 104, and then supplies such sum to an FM detecting circuit 105.

The FM detecting circuit 105 performs FM detection of the signal outputted from the adder 102, thereby detecting the biphase signal and outputting the same to a biphase decoder 106. The circuit 105 further serves to extract the carrier signal out of the signal supplied from the adder 102, and then outputs the extracted signal to the servo circuit 7.

The biphase decoder 106 decodes the output biphase signal of the FM detecting circuit 105 to form an address information signal, and then outputs this signal to an error correcting circuit 107.

The error correcting circuit 107 performs error correction of the address information signal supplied thereto from the biphase decoder 106, and then outputs the error-corrected address information signal to the address decoder 5.

Subsequently the level detector/comparator 103 compares the amplitude of the output signal from the BPF 101 with the amplitude of the output signal from the BPF 104 to thereby discriminate between the tracks.

In an exemplary case where data recording or reproduction is performed with irradiation of laser beams as shown in FIG. 13, the signal E+F (or E−F) obtained by receiving the laser beams irradiated to the wobbled edges 15-1 and 15-2 has a frequency proximate to the carrier signal frequency, so that the amplitude of the output signal from the BPF 101 indicates a predetermined value.

Meanwhile, the signal G+H (or G−H) obtained by receiving the laser beams irradiated to the non-wobbled edges (between the tracks T1 and T2) includes only the DC component, so that the amplitude of the output signal from the BPF 104 is substantially zero. Therefore, it becomes possible, by comparing the output of the BPF 101 with that of the BPF 104, to make a decision as to whether the track, where recording or reproduction is currently performed, is an odd-numbered track or an even-numbered one.

In the manner mentioned above, the address information is read out, with discrimination between the tracks, from the disk 11 where the left and right edges 15-1 to 15-4 of the grooves not constituting tracks are wobbled in every other track correspondingly to the address information.

Figure 16:
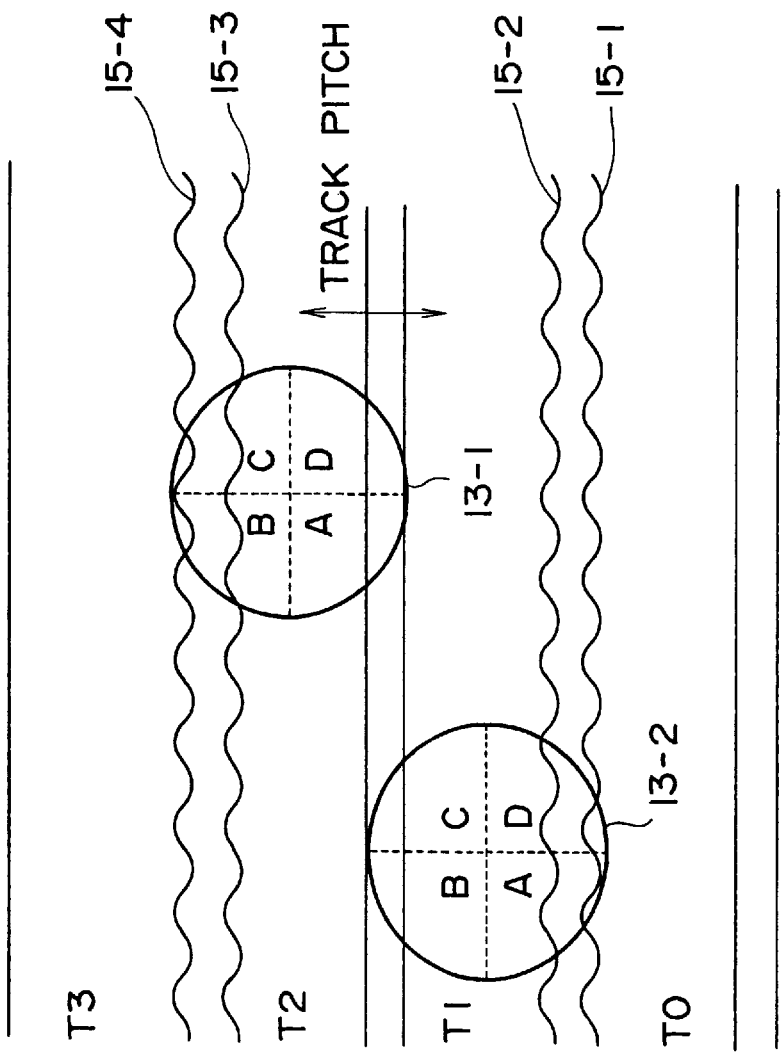
FIG. 16 illustrates how address information in the recording medium of FIG. 13 is read out by the use of a data recording/reproducing laser beam.

FIG. 16 illustrates how the address information is read out from the disk 11 by using, instead of the side beam spots 13-2 and 13-3, a data recording/reproducing laser beam spot 13-1.

When the address information is read by the use of a data recording/reproducing laser beam, the data recording/reproducing laser beam spot 13-1 is so irradiated that, in a track T1, its irradiation regions A and D include the wobbled edges 15-1 and 15-2. Meanwhile in a track T2, the data recording/reproducing laser beam spot 13-1 is so irradiated that its irradiation regions B and C include the wobbled edges 15-3 and 15-4.

In this case, the beam corresponding to the irradiation regions A and D is used instead of the beam corresponding to the irradiation regions E and F shown in FIG. 13, and the beam corresponding to the irradiation regions B and C is used instead of the beam corresponding to the irradiation regions G and H shown in FIG. 13. In the wobble signal detector 9, the address can be read by using the signal (A+D) from the calculating circuit 72 instead of the signal (E+F or E−F) from the calculating circuit 71, and also by using the signal (B+C) from the calculating circuit 72 instead of the signal (G+H or G−H) from the calculating circuit 73.

According to the above technique that executes the address reading operation by using the data recording/reproducing laser beam, the tracking servo control is not restricted particularly to any specific method.

As mentioned, the tracking-error detecting laser beam is irradiated to a target track wobbled correspondingly to the address information, and the desired address at the position irradiated with the data detecting laser beam is calculated on the basis of the amount of the return beam. Data are recorded or reproduced correspondingly to the address information.

The tracks formed to be spiral in the above examples may be concentric as well. Further, it is to be noted that the optical disk apparatus of the present invention is not limited merely to the first and second embodiments, and also that grooves and tracks in the present invention are not limited to the exemplary shapes illustrated in FIGS. 5 and 13. Moreover, the present invention is applicable to any recording medium other than the aforementioned disk.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A recording medium with address information retained relative to tracks where data are recorded, said recording medium having lands and grooves arranged alternately, and one of them constitutes said tracks, wherein wobbled grooves and non-wobbled DC grooves are arranged alternately while the lands are interposed therebetween.

2. The recording medium according to claim 1, wherein said wobbled grooves have address information.

3. The recording medium according to claim 1, wherein odd-numbered ones of said tracks and even-numbered ones thereof are formed to be spiral separately.

4. A recording medium with address information retained relative to tracks where data are recorded and/or reproduced, said recording medium so composed that lands and grooves are arranged alternately, and the lands constitute said tracks, wherein the wobbled grooves having address information and the non-wobbled DC grooves are arranged alternately while each of the lands is interposed therebetween, and the mutually adjacent tracks with the wobbled groove interposed therebetween share the address information of said interposed groove.

5. A method of recording information on a recording medium where lands and grooves are formed alternately, said method comprising the step of alternately arranging the wobbled and non-wobbled DC grooves, which are wobbled on the basis of address information, and the non-wobbled DC grooves while interposing each of the lands therebetween.

6. A recording medium wherein lands and grooves are arranged alternately and one of them constitutes data recording areas, and the wobbled grooves and the non-wobbled DC grooves are arranged alternately.

7. An optical disk apparatus for recording data from an optical disk where lands and grooves are formed alternately, said apparatus comprising
   an irradiator means for irradiating a first light beam spot to a target track on the optical disk where the grooves, which are wobbled on the basis of address information, and non-wobbled DC grooves are formed alternately while each of the lands is interposed therebetween, and one of the group consisting of the lands and the grooves constitutes data recording tracks, said irradiator means further irradiating second and third light beam spots to the diametrical two sides of the first light beam spot;
   a light beam receiver means for receiving the reflections of said first, second and third light beam spots from said optical disk, to thereby obtain first, second and third signals; and
   a calculator means for calculating an address signal on the basis of said second and third signals.

8. The optical disk apparatus according to claim 7, wherein said lands constitute data recording and/or reproducing tracks, and odd-numbered ones of said tracks and even-numbered ones thereof are formed to be spiral separately.

9. The optical disk apparatus according to claim 8, wherein the mutually adjacent tracks with the wobbled groove interposed therebetween share the address information of said interposed groove.

10. The optical disk apparatus according to claim 7, further comprising a discriminator means for discriminating, on the basis of said second and third signals, the track where data are recorded.

11. An optical disk apparatus for recording data from an optical disk where lands and grooves are formed alternately, said apparatus comprising:
    an irradiator means for irradiating a light beam spot to a target track on the optical disk where the grooves wobbled on the basis of address information and the non-wobbled DC grooves are formed alternately while the lands are interposed therebetween, and one form the group consisting of the lands and the grooves constitutes data recording tracks;
    a light beam receiver means for receiving the reflection of said light beam spot from said optical disk; and
    a calculator means for calculating, on the basis of the output of said light beam receiver means, the address of the position where data are recorded.

12. The optical disk apparatus according to claim 11, further comprising a discriminator means for discriminating, on the basis of the output of said light beam receiver means, the track where data are recorded and/or reproduced.

13. A recording medium as in claim 1, wherein said recording medium has address information retained relative to tracks where data are reproduced.

14. An optical disk apparatus as in claim 7, wherein said optical disk apparatus reproduces data from said optical disk.

15. An optical disk apparatus as in claim 11, wherein said optical disk apparatus reproduces data from said optical disk.

16. A recording medium with address information retained relative to tracks where data are reproduced, said recording medium so composed that lands and grooves are arranged alternately, and one of them constitutes said tracks, wherein the wobbled grooves and the non-wobbled DC grooves are arranged alternately while the lands are interposed therebetween.

17. The method of claim 5, further comprising the steps of:
    selecting one from the group consisting of the lands and the grooves to be tracks for recording data; and
    retaining address information on the data recording medium relative to said tracks where data are recorded.

18. The method of claim 17, further comprising the step of selecting the wobbled grooves for retaining the address information.

19. The method of claim 5, further comprising the step of forming odd-numbered and even-numbered tracks to be separately spiral.

20. The method of claim 18, further comprising the step of selecting the lands to be tracks for recording data, and retaining address information relative to each pair of mutually adjacent tracks on the wobbled groove interposed therebetween.

21. A method of recording information on a recording medium having lands and grooves arranged alternately, comprising the steps of:
    arranging wobbled and non-wobbled DC grooves alternately among the grooves;
    recording data on one of the group consisting of the lands and the grooves.

22. A method of reproducing information from an optical recording medium using an optical disk apparatus having wobbled and non-wobbled DC grooves arranged alternately, each pair of grooves having a land interposed therebetween, comprising the steps of:

irradiating a target track on the optical disk with a first light beam spot;

irradiating two diametrical sides of the first light beam spot with a second and a third light beam spots;

receiving the reflections of said first, second and third light beam spots from said optical disk, to thereby obtain first, second and third signals; and calculating an address signal on the basis of said second and third signals.

23. The method of claim 22, further comprising the steps of:

selecting the lands for data recording tracks; and forming odd-numbered and even-numbered tracks to be separately spiral.

24. The method of claim 22, further comprising the steps of:

selecting the lands for data recording tracks; and recording address information relative to mutually adjacent tracks on the wobbled groove interposed therebetween.

25. The method of claim 22, further comprising the step of discriminating, on the basis of said second and third signals, the track where data are reproduced.

26. A method of reproducing information from an optical recording medium using an optical disk apparatus having wobbled and non-wobbled DC grooves arranged alternately, each pair of grooves having a land interposed therebetween, comprising the steps of:

irradiating a target track on the optical disk with a light beam spot;

receiving the reflection of said light beam spot from said optical disk; and calculating, on the basis of the received reflection of said light beam, the address of the position where data are reproduced.

27. The method of claim 26, further comprising the step of discriminating, on the basis of the received reflection of said light beam, the track from which data are reproduced.

* * * * *